(No Model.)
W. A. RIGGS, Sr.
PROCESS OF AND APPARATUS FOR DEFECATING CANE JUICE.
No. 297,848. Patented Apr. 29, 1884.
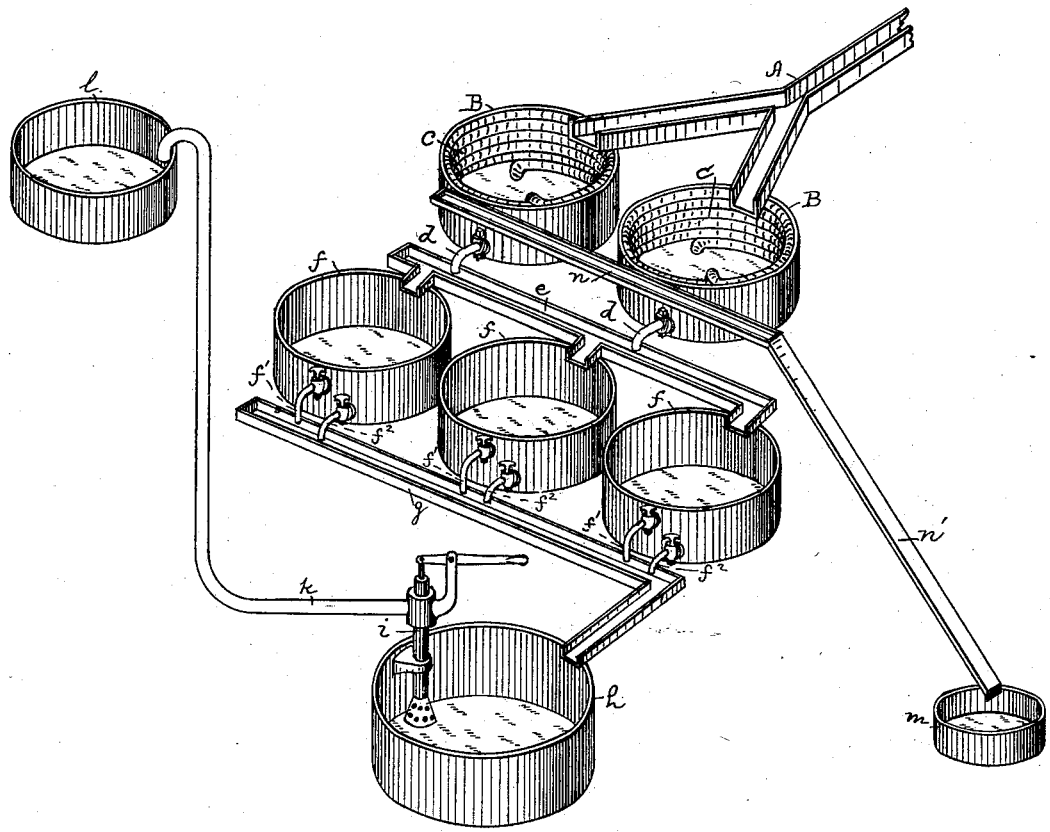
WITNESSES
INVENTOR
William A. Riggs, Sr.
By H. N. Jenkins
ATTORNEY

UNITED STATES PATENT OFFICE.

WILLIAM A. RIGGS, SR., OF NEW ORLEANS, LOUISIANA.

PROCESS OF AND APPARATUS FOR DEFECATING CANE-JUICE.

SPECIFICATION forming part of Letters Patent No. 297,848, dated April 29, 1884.

Application filed October 6, 1883. (No model.)

*To all whom it may concern:*

Be it known that I, WILLIAM A. RIGGS, Sr., a resident of the city of New Orleans, parish of Orleans, and State of Louisiana, have invented a certain new and useful Improvement in Process of and Apparatus for Defecating Cane-Juice; and I do hereby declare the following to be a full, clear, and correct description of the same, reference being had to the annexed drawings, making a part of this specification.

My invention relates to certain improvements in the manufacture of sugar; and it consists, first, in a process for defecating cane-juice, and, secondly, in the construction and arrangement of an apparatus for carrying out the said process.

The accompanying drawing is a perspective view of my improved apparatus, the various parts of which are hereinafter designated by letters of reference.

The process consists, first, in boiling the cane-juice in its natural state as soon as it comes from the mill, in removing the skimmings during the said boiling, and in drawing off the boiled juice or sirup into suitable tanks, in which is introduced certain quantities of lime or other alkali. By this process I first coagulate the albumen, which, together with all other impurities, is, by the action of the lime or alkalies, precipitated within the short space of one and a half or two hours.

On the drawing, the letter A designates a trough for conveying the juice from the juice-pan of an ordinary cane-mill to the boiling-tanks or grandes B, having steam-pipes c, for heating and boiling the said juice, which, at the proper time, is withdrawn through faucets d into a trough, e, having side outlets for discharging into the defecating-tanks f, the latter provided at different elevations with two or more draw-off cocks or valves, f' f'', one of which is located about three inches above the bottom of the tank, and the upper one some ten or twelve inches above the same, so as to permit of the withdrawal of the liquid without disturbing the impurities at the bottom of the tanks.

Immediately below the above-mentioned draw-off cocks or valves is located a trough, g, for conveying the purified liquid to a tank, h, from whence it is transferred by means of a pump, h, and pipe i to an elevated receiver, k, to be conveyed therefrom, by any desired means, to the evaporating-pans for conversion into sugar.

The letter l designates a tank for collecting the skimmings from the boiling-pans, the same being transferred from the top of said pans, by means of skimmers, to a trough, m, having a downward chute, as shown at n.

The letter O designates a vessel for receiving from the different tanks the residuum collected therein. This vessel may be connected with the bottoms of said tanks by means of pipes having suitable check-valves or stop-cocks. The residuum thus collected, together with the skimmings and a sufficiency of warm water for liquidizing the same, may be conveyed by any suitable means back to the boiling-tanks for the extraction of additional quantities of sirup.

Although not shown in the drawing, gates may be employed in the different troughs, for the purpose of closing the outlet to any one or more of the pans, thus directing the liquid to others of the series, by which plan the defecating-pans may be successively filled, and thus ample time afforded for the settling and drawing off of the liquid therefrom before it is rendered necessary to again charge the same.

Having described my invention, what I claim as new, and desire to secure by Letters Patent, is—

1. The process herein described of defecating cane-juice, the same consisting in first boiling the cane-juice in its natural state as soon as it comes from the mill, in removing the skimmings during the said boiling process, and in drawing off the boiled juice or sirup into suitable tanks, wherein it is treated with lime or other alkalies, substantially as and for the purpose set forth.

2. The apparatus herein described for defecating cane-juice, consisting of the boiling-tanks B, provided with steam-pipes $c$ and faucets $d$, in combination with the defecating-tanks $f$, having two or more draw-off cocks or valves, located as described, and for the purpose specified.

3. The cane-juice-defecating apparatus herein described, consisting of boiling-tanks B, provided with heating-pipes $c$ and faucets $d$, the defecating-tanks $f$, provided with faucets, as described, the trough $g$ and tank $h$, pump $i$, with pipe $k$, and the receiving-tank $l$, all arranged as described, and for the purpose set forth.

In testimony whereof I affix my signature in presence of two witnesses.

WM. A. RIGGS, SR.

Witnesses:
 JNO. R. YOUNG,
 WM. H. ROWE.